(12) United States Patent
Wäller et al.

(10) Patent No.: US 9,817,480 B2
(45) Date of Patent: Nov. 14, 2017

(54) METHOD FOR OPERATING AN ELECTRONIC DEVICE OR AN APPLICATION, AND CORRESPONDING APPARATUS

(75) Inventors: Christoph Wäller, Brainschweig (DE); Mark Peter Czelnik, Wolfsburg (DE); Linn Hackenberg, Wolfsburg (DE); Lennart Bendewald, Wolfsburg (DE); Manuel Joachim, Hannover (DE); Markus Ablassmeier, Ergoldsbach (DE); Michael Mischke, Hannover (DE)

(73) Assignee: VOLKSWAGEN AG, Wolfsburg (DE)

( * ) Notice: Subject to any disclaimer, the term of this patent is extended or adjusted under 35 U.S.C. 154(b) by 605 days.

(21) Appl. No.: 14/239,382

(22) PCT Filed: Aug. 4, 2012

(86) PCT No.: PCT/EP2012/003335
§ 371 (c)(1),
(2), (4) Date: Jun. 4, 2014

(87) PCT Pub. No.: WO2013/023751
PCT Pub. Date: Feb. 21, 2013

(65) Prior Publication Data
US 2014/0300561 A1    Oct. 9, 2014

(30) Foreign Application Priority Data
Aug. 18, 2011    (DE) .................. 10 2011 110 978

(51) Int. Cl.
*G06F 3/01*    (2006.01)
*G06F 17/30*    (2006.01)
(Continued)

(52) U.S. Cl.
CPC .............. *G06F 3/017* (2013.01); *B60K 35/00* (2013.01); *B60K 37/06* (2013.01); *G06F 3/041* (2013.01);
(Continued)

(58) Field of Classification Search
CPC .... G06F 3/017; G06F 3/041; G06F 17/30764; G06F 2203/0382; G06F 3/04883;
(Continued)

(56) References Cited

U.S. PATENT DOCUMENTS 6,088,481 A * 7/2000 Okamoto .............. G06F 3/0488
345/179
2003/0093419 A1 5/2003 Bangalore et al.
(Continued)

FOREIGN PATENT DOCUMENTS

CN    1926503 A     3/2007
DE    10003737 A1   8/2001
(Continued)

OTHER PUBLICATIONS

Li; Gesture Search: A Tool for Fast Mobile Data Access; UIST' 10; Oct. 3-6, 2010; New York, New York.
(Continued)

*Primary Examiner* — Aneeta Yodichkas
(74) *Attorney, Agent, or Firm* — Barnes & Thornburg LLP

(57) ABSTRACT

Methods for the operator control of electronic appliances and appropriately set-up electronic appliances in which an input of at least one letter is captured independently of an input request, and a volume of data is displayed on a screen of the electronic appliance on the basis of the captured letter. The input may be made by handwriting or by voice input, for example.

20 Claims, 6 Drawing Sheets

(51) Int. Cl.
*G06F 3/041* (2006.01)
*G06F 3/0488* (2013.01)
*B60K 35/00* (2006.01)
*B60K 37/06* (2006.01)

(52) U.S. Cl.
CPC .................. *G06F 17/30764* (2013.01); *B60K 2350/1004* (2013.01); *B60K 2350/1024* (2013.01); *B60K 2350/1028* (2013.01); *B60K 2350/1052* (2013.01); *G06F 3/04883* (2013.01); *G06F 2203/0382* (2013.01)

(58) Field of Classification Search
CPC ............ B60K 37/06; B60K 2350/1004; B60K 2350/1028; B60K 2350/1024; G60K 35/00; G60K 2350/1052
See application file for complete search history.

(56) References Cited

U.S. PATENT DOCUMENTS

2006/0227065 A1* 10/2006 Yukawa ................ G06F 3/0482
345/7

2006/0262103 A1* 11/2006 Hu .......................... G06F 3/023
345/173
2009/0055771 A1* 2/2009 Nurmi ................... G06F 3/0482
715/810

FOREIGN PATENT DOCUMENTS

| DE | 10042983 A1 | 3/2002 | |
|---|---|---|---|
| DE | 102004010406 B3 | 10/2005 | |
| DE | 102008049636 A1 | 4/2010 | |
| DE | 102009021124 A1 | 9/2010 | |
| FI | WO 2005003944 A1 * | 1/2005 | ............ G06F 3/038 |
| KR | 100252739 B1 | 4/2000 | |
| WO | 2005003944 A1 | 1/2005 | |

OTHER PUBLICATIONS

Search Report for German Patent Application No. 10 2011 110 978.5; Jul. 18, 2012.
Search Report for International Patent Application No. PCT/EP2012/003335; Nov. 29, 2012.
Office Action for Korean Patent Application No. 10-2014-7006836; Oct. 7, 2015.

* cited by examiner

METHOD FOR OPERATING AN ELECTRONIC DEVICE OR AN APPLICATION, AND CORRESPONDING APPARATUS

PRIORITY CLAIM

This patent application is a U.S. National Phase of International Patent Application No. PCT/EP2012/003335, filed 4 Aug. 2012, which claims priority to German Patent Application No. 10 2011 110 978.5, filed 18 Aug. 2011, the disclosures of which are incorporated herein by reference in their entirety.

SUMMARY

The present disclosure relates to methods for the operator control of electronic devices and/or applications and also to corresponding apparatuses, particularly in a vehicle, such as a motor vehicle. The present disclosure also relates to appropriately equipped vehicles.

BRIEF DESCRIPTION OF THE DRAWINGS

Illustrative embodiments are explained in more detail below with reference to the appended drawings, in which.

DETAILED DESCRIPTION OF THE DISCLOSED EMBODIMENTS

Various illustrative embodiments are explained in more detail below. It should be noted that features of various illustrative embodiments can be combined with one another unless stated otherwise. On the other hand, a description of an illustrative embodiment with a multiplicity of features is not intended to be interpreted to mean that all of these features are necessary for implementing the invention, since other illustrative embodiments may have fewer features or alternative features.

Figure 1:
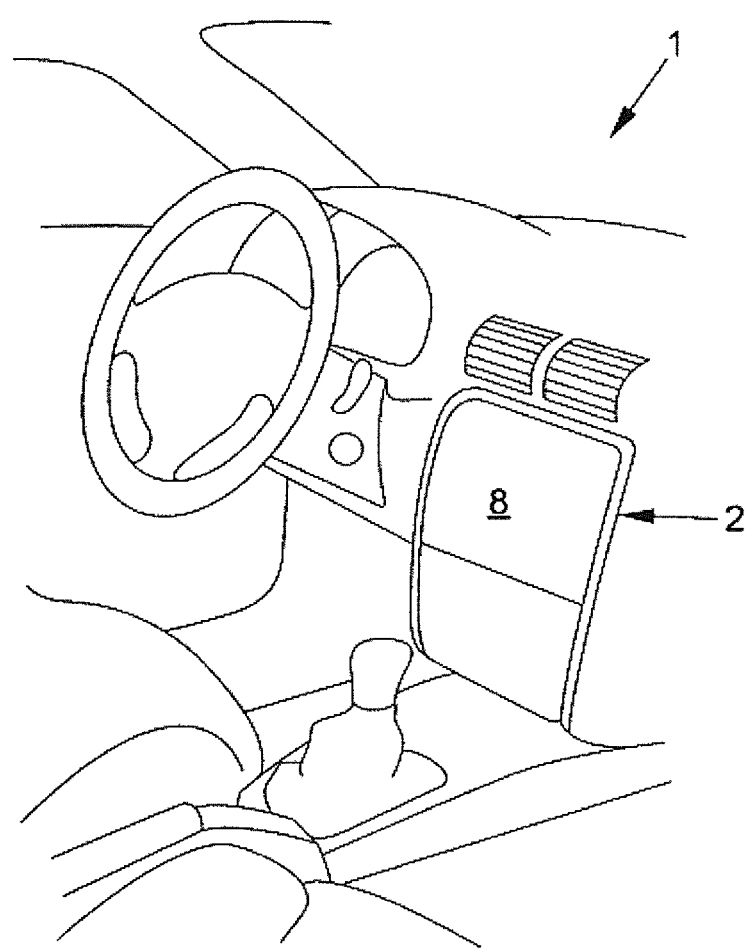
FIG. 1 shows a cockpit of a vehicle that is equipped with an apparatus according to an illustrative embodiment.

FIG. 1 shows a cockpit of a vehicle 1 that is equipped with an apparatus 2 according to an illustrative embodiment. In this case, the apparatus 2 is used particularly for the operator control of functions of the vehicle 1. By way of example, the apparatus 2 can be used to control a radio, a navigation system, playback of stored pieces of music and/or an air conditioning system, other electronic devices or other convenience functions or applications of the vehicle 1. Such apparatuses are also known as infotainment systems. In the region of a central console of the vehicle 1, the apparatus 2 has a display device in the form of a touch-sensitive screen 8, also called the touchscreen, this screen 8 being able to be clearly seen and operated both by a driver of the vehicle 1 and by a front-seat passenger in the vehicle 1. Arranged beneath the screen 8 there may also be mechanical operator control elements, for example keys, rotary controls or combinations thereof, such as rotary push controls.

Figure 2:
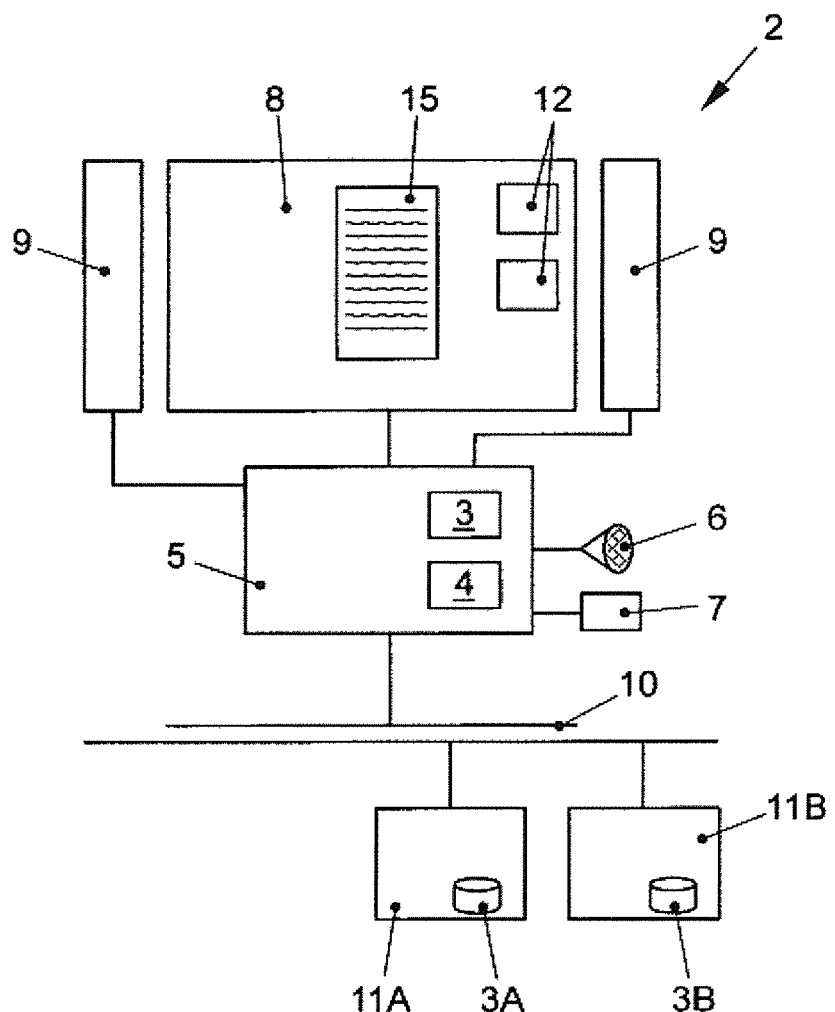
FIG. 2 shows a block diagram of an illustrative embodiment of an apparatus.

FIG. 2 schematically shows a disclosed embodiment of the apparatus 2. Components of the apparatus 2 that are not shown in FIG. 1 may nevertheless also be existent in the illustrative embodiment in FIG. 1 and arranged at a suitable location in the vehicle 1, for example in the cockpit of the vehicle.

The apparatus 2 of the disclosed embodiment in FIG. 2 comprises various means and devices for capturing user inputs, for example a microphone 6 that is connected to a control device 5, wherein the control device 5 is set up to use an analysis unit 4 to process and analyze voice that is input via the microphone 6. In addition, the touch-sensitive screen 8 is provided for the purpose of capturing touch inputs. Furthermore, a further touch-sensitive screen 7 may be provided. The further touch-sensitive screen 7 may also be a terminal that can be detachably connected to the vehicle and that has a touch-sensitive interface, for example what is known as a smartphone or a tablet computer. By way of example, this terminal can be inserted into a bracket provided for the purpose in the vehicle and can set up a data link to the control device 5 of the apparatus 2, for example a wireless link such as a Bluetooth link or a wired connection. In other illustrative embodiments, instead of the further touch-sensitive screen 7, another touch-sensitive element, for example what is known as a touchpad, may also be provided. As will be explained in more detail later, the screen 8 or 7 can present graphical objects 12 and lists 15, in particular, the lists being able to be displayed on the basis of inputs by a user, particularly by a driver of the vehicle.

The control device 5 may optionally be connected to a camera system 9 that monitors a region around the screen 8. By way of example, the camera system 9 may be arranged next to the screen 8 or at a suitable location in the cockpit or on the roof lining of the passenger compartment and can capture particularly gestures contactlessly even when only in front of the display panel of the screen, so that this provides a further input modality.

In the illustrative embodiment shown, the control device 5 has an integrated data memory 3 that can store various information, for example information about available pieces of music or information regarding a navigation system. In addition, the control device 5 has the analysis unit 4, which analyzes particularly inputs by a user and can take this as a basis for initiating functions in the vehicle, for example can change a presentation on the screen 8 or can initiate other functions, for example playback of pieces of music.

In addition, the control device 5 is connected to a data bus 10 in the vehicle 1 that it can use to communicate with other functional devices 11A, 11B in the vehicle 1, functional devices 11A, 11B having data memories 3A and 3B, respectively. By way of example, such functional devices may comprise a navigation system, a music playback device or a device for the setting and operator control of various functions in the vehicle 1. The data memories 3A, 3B may then store, by way of example, map data in the case of a navigation system or music data, such MP3 files, in the case of a music playback system, as appropriate. Information about what data are held in the data memories 3A, 3B may be stored in the memory 3 of the control device 5. In other disclosed embodiments, the control device 5 directly accesses the functional devices 11A, 11B to obtain such information.

As will be explained in more detail below with the aid of examples, the apparatus 2 provides particularly options that an operator can easily use to find contents, for example contents stored in the memory 3 or in the data memories 3A and 3B, or to select the contents from a larger number of contents. To this end, particularly for selection in lists, it is possible for characters, for example letters, digits or symbols, to be input in handwriting using the screen 8 or the screen 7 or else to be input as voice using the microphone 6. Various examples of this are explained below with reference to FIGS. 3 to 8.

Figure 3:
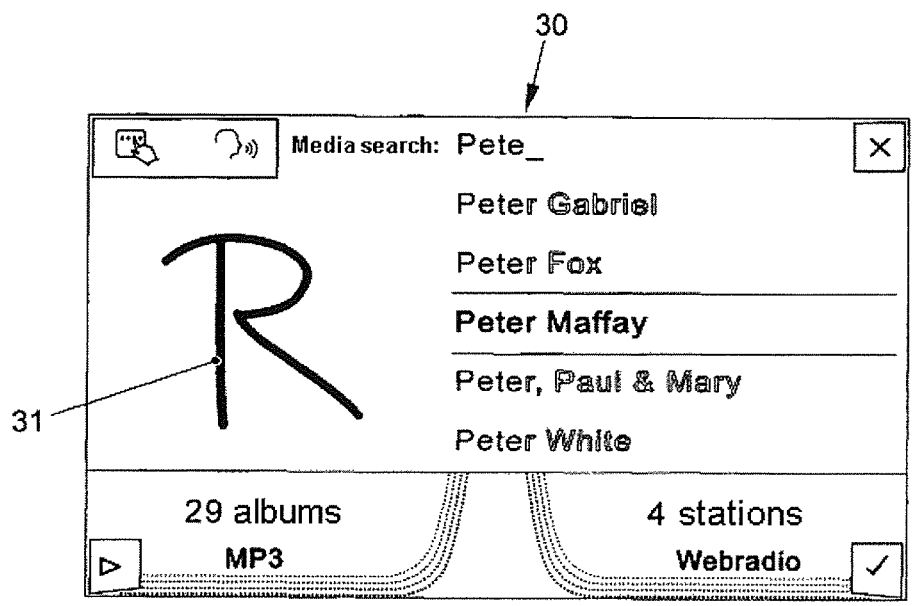
FIGS. 3-8 show various examples of inputs of letters according to illustrative embodiments.

FIG. 3 shows an example of a display on the touch-sensitive screen 8, which involves the selection of a musical artist, for example. A list 30 displays various artists that begin with Pete. An operator can then use handwriting to input a further letter, for example an "R" 31, whereupon the list 30 can be substantiated further. Examples of substantiation of such lists are explained later. In principle, such a function can be provided when lists are displayed without a separate input request being provided or needing to be requested by an operator.

Figure 4:
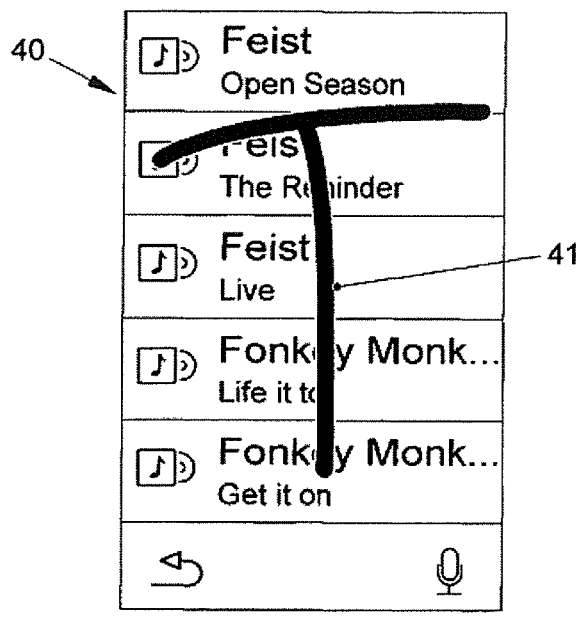

In particular, in the case of smaller screens as shown in FIG. 4, a letter 41 can be written directly on a list 40 in this case. By way of example, such smaller screens may be screens like the screen 7 from FIG. 2 that are attributable to a mobile terminal such as a smartphone. In the example in FIG. 4, the character or letter specified is T. Such writing directly on lists or volumes of data presented in another form may also be advantageous when other data are presented in other regions of a screen, so that it is then possible to attribute the character to a search in the list without any problems. By way of example, when writing directly onto a list, the analysis unit 4 in FIG. 2 may be set up to distinguish between the writing of a letter and other operator control gestures, for example scrolling through a list. By way of example, this can be accomplished by reserving a region for such further gestures at the edge of the list, or by interpreting an input as a further gesture when it cannot be attributed to a letter.

It should be noted that, in addition to operator control or substantiation of the lists by means of characters, the list can also be served using other operator control elements, for example a rotary push element as mentioned at the outset.

In further illustrative embodiments, the input of a character, such as a letter, for example a handwritten input, when no list or other volume of data is displayed may involve the letter being taken as a basis for starting a search and then an appropriate volume of data being displayed in a list, for example. In this case, the search may be a global search over all the contents of the electronic appliance and/or functional devices linked thereto or a search just in some of the contents. What type of search is performed may be context dependent. If a user interface for music playback is displayed on a screen such as the screen 8, for example, a search can be performed just over music-related data, for example a search for artists and/or pieces of music. If a screen presentation cannot be attributed to a specific application (for example presentation of a menu that can be used to call various applications such as music playback, navigation or vehicle settings), on the other hand, a global search over all contents can be performed, for example. Such a search can be initiated in particular when a free area on the screen is being written on.

With reference to FIGS. 3 and 4, operator control by handwritten character input has been explained. In addition or alternatively, characters can also be input by speaking the character, for example using the microphone 6 shown in FIG. 2. Optionally, both options are provided, so that different modalities for character input are available. In this case, optionally, characters input by handwriting and characters input by speaking are treated in the same way, i.e. they initiate the same reactions. This is now explained with reference to FIGS. 5 and 6.

Figure 5:
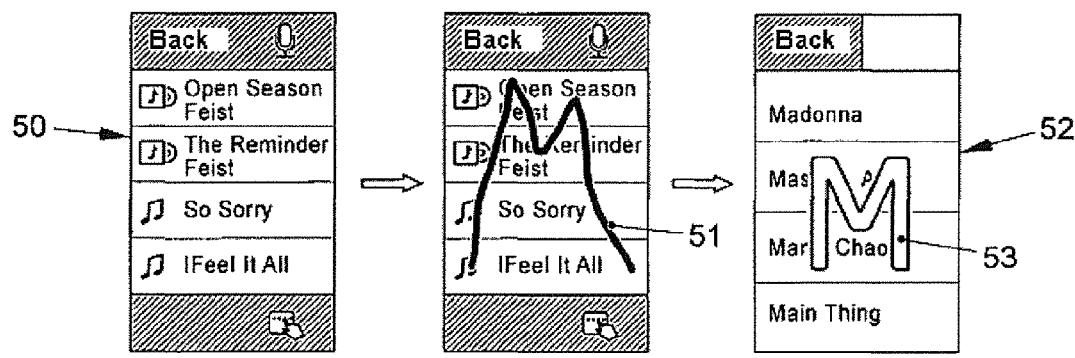

To the left of FIG. 5, a list 50 is shown. Handwritten input of a character 51, in this case an "M", modifies the list to produce the list 52, in this case only list elements beginning with the letter "M" being displayed. In addition, the recognized character, in this case "M", can be briefly displayed on the list as a letter 53, for example in transparent form.

Figure 6:
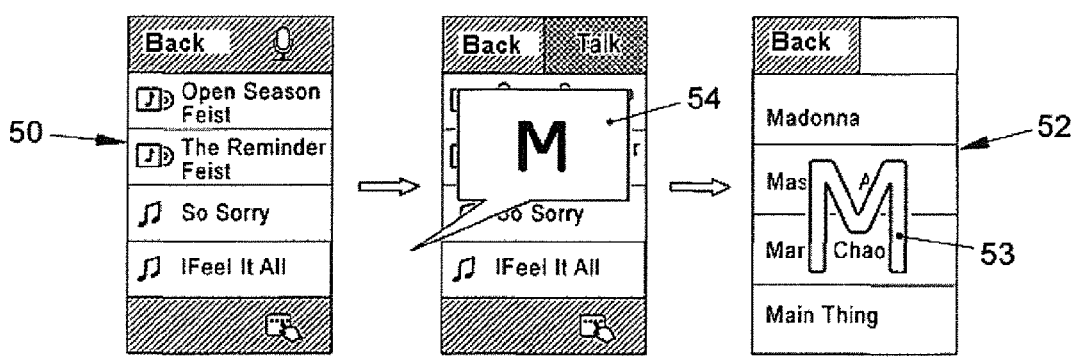

FIG. 6 shows essentially the same process, the only difference here being that instead of handwritten input of a letter 51 voice input of a character 54, likewise an "M", is effected. Otherwise, the reaction of the system is exactly the same as for a handwritten input, as shown in FIG. 6.

The input of a character, for example by writing a letter onto the list or by means of voice input, allows a list to be modified in various ways. Two options for this are shown in FIGS. 7 and 8.

Figure 7:
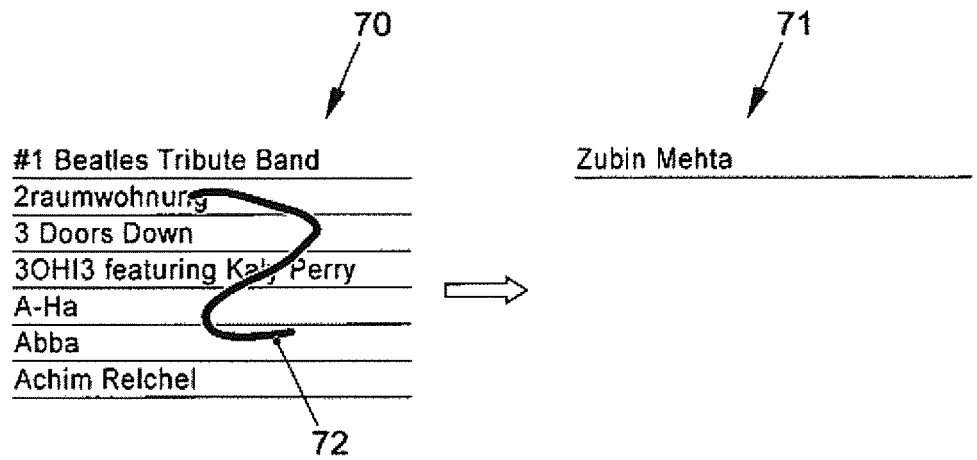

In the example in FIG. 7, a letter 72, in this case a "Z", is written onto a list 70 that shows various artists, for example. As a reaction to this, the list is now displayed as a list 71 with those elements that begin with "Z", in this case now just a single element. The list content is thus altered during this procedure.

Figure 8:
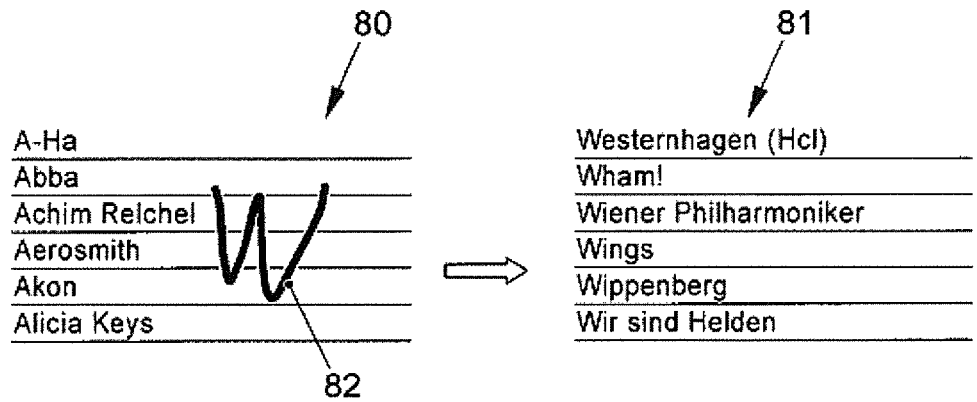

In the example in FIG. 8, a list 80 with various artists is again displayed. When a letter 82, in this case a "W", is input, the list is shifted ("scrolled"), and in this example the display then changes as indicated by a reference symbol 81, i.e. the beginning of the displayed section of the list corresponds to the first entry that begins with "W". The content of the list itself is not altered during this procedure, but the displayed list positions change. The option in FIG. 8 is particularly suitable for sorted lists.

It should be noted that the input does not need to be limited to a single character, but rather a plurality of characters, e.g. letters, can also be specified in succession, for example as a word or word portion. If there is sufficient space on a touch-sensitive screen, this can be effected as a handwritten input next to one another, or a plurality of characters, e.g. as a word or word portion, can be spoken in succession. If there is little space, for example in the case of an input on a smartphone, the characters can be written progressively above one another. In this case, the evaluation unit 4 may be set up to consider a plurality of successively input characters to belong together if no more than a prescribed period of time elapses between the inputs.

Figure 9:
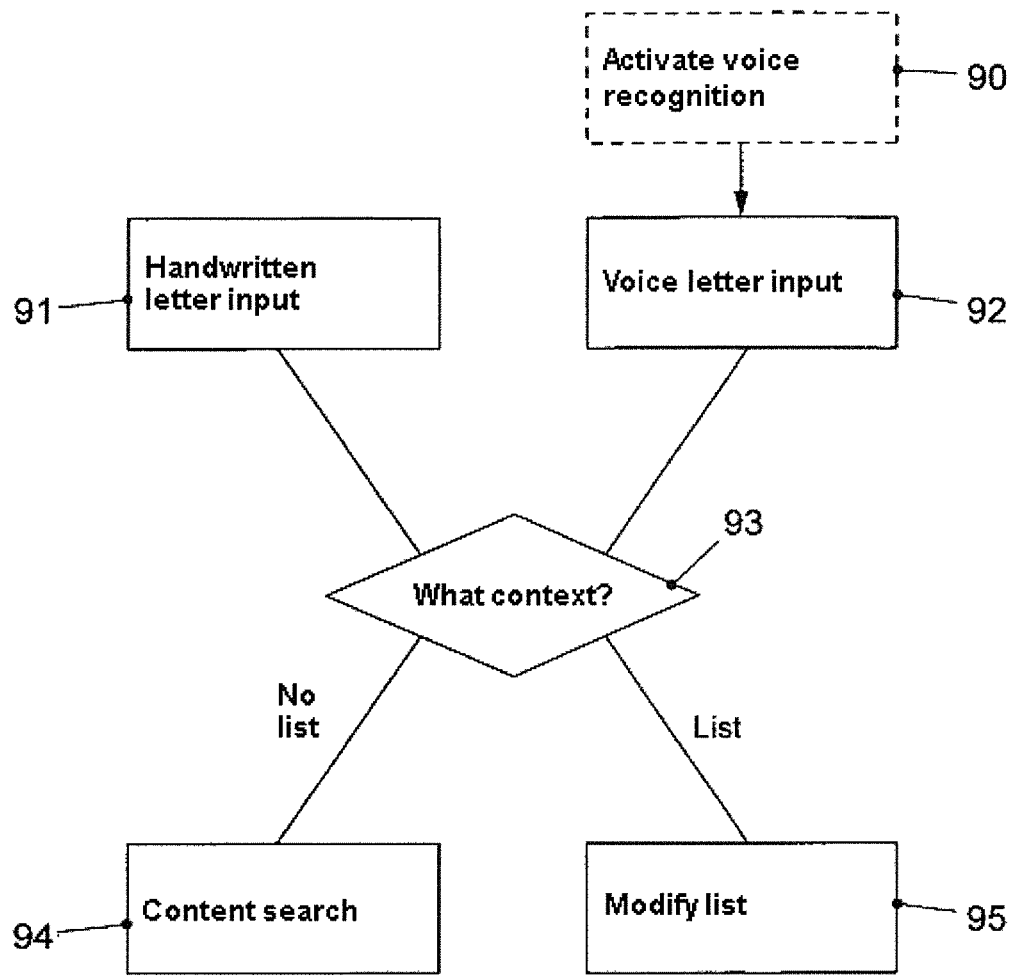
FIG. 9 shows a flowchart to illustrate an illustrative embodiment of a method.

FIG. 9 shows a flowchart that illustrates a disclosed embodiment of a method. By way of example, the method in FIG. 9 may be implemented in the apparatus 2 in FIGS. 1 and 2, but can also be used independently thereof.

In step 91, one or more characters are input by handwriting. Alternatively, in step 92, one or more characters can be input by voice. To this end, voice recognition can optionally be activated in a preceding step 90, for example by an action by a user, to prevent normal conversations in a vehicle from being assessed as a voice input, for example.

Regardless of the manner in which one or more letters are input, the method is continued in the same way in step 93, which involves checking the context in which the character input was made. If the character input was made on a list, the list is modified in step 95, for example as explained with reference to FIGS. 7 and 8. If the character input was not produced on a list and/or no list was displayed, a search over contents is performed in step 94 and the result of the search is displayed as a list, for example, the search being able to be effected globally or just over some available contents depending on the context, as already explained further above.

It should be noted that the illustrative embodiments presented above are used only for explanation and are not intended to be interpreted as restrictive. In particular, various modifications and variations for the disclosed embodiments described above are possible. By way of example, instead of lists it is also possible to use other types of display of volumes of data, for example in the form of pictograms, which represent individual data items. The various data, for example elements in the lists or pictograms, do not necessarily need to be arranged beneath one another as shown in the figures.

When character input reduces the number of elements in a list to one, some illustrative embodiments may involve a function linked to the remaining element being executed without further consultation with an operator, for example a corresponding piece of music being played or navigation to a corresponding destination being started.

Even though the illustrative embodiments described above relate to use of the invention in a vehicle, the invention can be applied generally for electronic appliances, particularly for electronic appliances that have a touch-sensitive screen or other touch-sensitive element and/or a microphone.

The volume of data that a driver of a motor vehicle can retrieve has steadily increased in recent years. By way of example, an electronic device that is set up as an operator control device in a motor vehicle can be used to retrieve relatively large volumes of data for audio or video playback or for navigation purposes and to control appropriate applications, with media or contact data from Internet-based services also being able to be incorporated. It is therefore necessary to provide operator control methods and user interfaces that also allow simple access to such data, for example can be used to select a desired piece of music or a desired navigation destination.

Particularly in a motor vehicle, it is desirable in this case for such operator control to be kept as simple as possible and efficient so as to minimize distraction of a driver by the operator control of devices and/or applications, for example using an operator control device such as an infotainment system in a vehicle.

By way of example, DE 100 42 983 B4 discloses the practice of inputting alphanumeric characters into a navigation system to determine a destination. Such a method for a navigation system is also known from DE 10 2008 049 636 A1.

US 2003/0093419 A1 discloses a system in which a user can input information by means of voice inputs or by operating a touchscreen.

Disclosed embodiments provide methods for the operator control of an electronic device and/or an application and also appropriately set-up apparatuses that facilitate operator control of the appliance and that are suitable particularly for use in a vehicle.

A method comprises capture of an input of at least one character, for example a letter, a digit or a symbol, independently of an input request and display of a volume of data, e.g. a list, on a display device, e.g. a screen, on the basis of the at least one character.

By virtue of inputs being captured independently of input requests in this way, operator control of the electronic appliance by the input of characters can take place without an operator having to wait for input requests, for example input boxes, or having to perform actions to produce such input requests. This simplifies the operator control of the electronic appliance.

Optionally, the input of the at least one character can be effected selectively using at least two different input modalities, for example by voice input or by handwritten input on a touch-sensitive screen, also called a touchscreen, or another touch-sensitive element, for example a touchpad. This allows a high level of flexibility.

Optionally, the display of the volume of data is independent of the input modality that was used to input the character. In other words, in the case of such disclosed embodiments, the various input modalities are handled in the same way, so that it makes no difference to a user how he selects the at least one character.

In the case of some illustrative embodiments, the display of the volume of data comprises modifying an already displayed volume of data on the basis of the at least one character. By way of example, the initially displayed volume of data can be reduced on the basis of the at least one character, so that, on the basis of the at least one character, now only some elements in the initially displayed volume of data are displayed, or a displayed detail from the volume of data can be altered on the basis of the at least one character. In the case of other disclosed embodiments, the input of the at least one character performs a search over all or some of the data that are existent in the electronic appliance or are linked thereto, and the volume of data contains a result for the search.

If the displayed volume of data comprises only one entry, some illustrative embodiments allow the automatic execution of a function linked to the entry, otherwise an entry can be selected from the volume of data for the purpose of executing a function, for example by inputting and capturing further characters or by using an operator control element of the electronic appliance for the purpose of selection.

A corresponding apparatus comprises a capture device for capturing an input of at least one character independently of an input request, a display device and a control device that is set up to actuate the display device to display a volume of data on the basis of the at least one letter. In particular, the capture device may have a microphone for capturing a voice input of the at least one character. In addition, the display device may comprise a touch-sensitive screen, which is therefore used as part of the capture device for capturing a handwritten input, and/or the capture device may have a further screen, which is touch sensitive, or another touch-sensitive element.

In particular, the apparatus may be set up to carry out one or more of the methods described above.

The invention claimed is:

1. A method for the operator control of at least one electronic device and/or application, the method comprising:
displaying a preceding volume of data on a display device, wherein the display device is touch sensitive;
capturing an input of at least one character independently of an input request, wherein the capture of the input of the at least one character comprises capture of a handwritten input of the at least one character on the display device at the location of the display of the preceding volume of data;
analyzing the captured handwritten input to identify and recognize the at least one character; and
altering display of a volume of data on the display device based on the recognized at least one character, wherein the altered display of data includes data associated with the recognized at least one character and the recognized at least one character is briefly superimposed on the volume of displayed data in response to recognition of the at least one character to a user.

2. The method of claim 1, wherein the recognized at least one character is briefly displayed in transparent form.

3. The method of claim 1, wherein capturing the input of the at least one character comprises capturing an input of a plurality of characters.

4. The method of claim 3, wherein the plurality of characters are written progressively above one another.

5. The method of claim 3, wherein a plurality of progressively input characters are considered to belong together if no more than a prescribed period of time elapses between the inputs.

6. The method of claim 1, wherein the volume of data is displayed as a list.

7. The method of claim 1, wherein the capture is effected without an action by an operator to produce an input request.

8. The method of claim 1, further comprising distinguishing between writing of a letter and other operator control gestures.

9. The method of claim 1, wherein the alteration of the preceding volume of data comprises a reduction of the number of elements in the preceding volume of data on the basis of the at least one character.

10. The method of claim 1, wherein the alteration of the preceding volume of data comprises a change of a displayed detail from the preceding volume of data.

11. The method of claim 1, wherein the at least one character comprises at least one letter, at least one digit and/or at least one symbol.

12. An apparatus, comprising:
a display device, wherein the display device is touch sensitive;
a control device that is set up to actuate the display device to display a preceding volume of data; and
a capture device comprising the display device for capturing an input of at least one character independently of an input request, wherein the capture of the input of the at least one character comprises capture of a handwritten input of the at least one character on the display device at the location of the display of the preceding volume of data,
wherein the control device analyzes the captured handwritten input to identify and recognize the at least one character, and
wherein the control device is set up to alter display of a volume of data on the display device based on the recognized at least one letter, wherein the altered display of data includes data associated with the recognized at least one character and the recognized at least one character is briefly superimposed on the volume of displayed data in response to recognition of the at least one character to a user.

13. The apparatus of claim 12, wherein the control device is set up to actuate the display device to briefly display the recognized at least one character in transparent form.

14. The apparatus of claim 12, wherein the capture device is set up to capture an input of a plurality of characters, wherein the plurality of characters are written progressively above one another.

15. The apparatus of claim 14, wherein the capture device is set up to consider a plurality of progressively input characters to belong together if no more than a prescribed period of time elapses between the inputs.

16. The apparatus of claim 12, wherein the volume of data is displayed as a list.

17. The apparatus of claim 12, wherein the capture device is set up to distinguish between writing of a letter and other operator control gestures.

18. The apparatus of claim 12, wherein the control device is set up to alter the preceding volume of data by reducing the number of elements in the preceding volume of data on the basis of the at least one character.

19. The apparatus of claim 12, wherein the control device is set up to alter the preceding volume of data by changing a displayed detail from the preceding volume of data.

20. The apparatus of claim 12, wherein the at least one character comprises at least one letter, at least one digit and/or at least one symbol.

* * * * *